Figure 13:
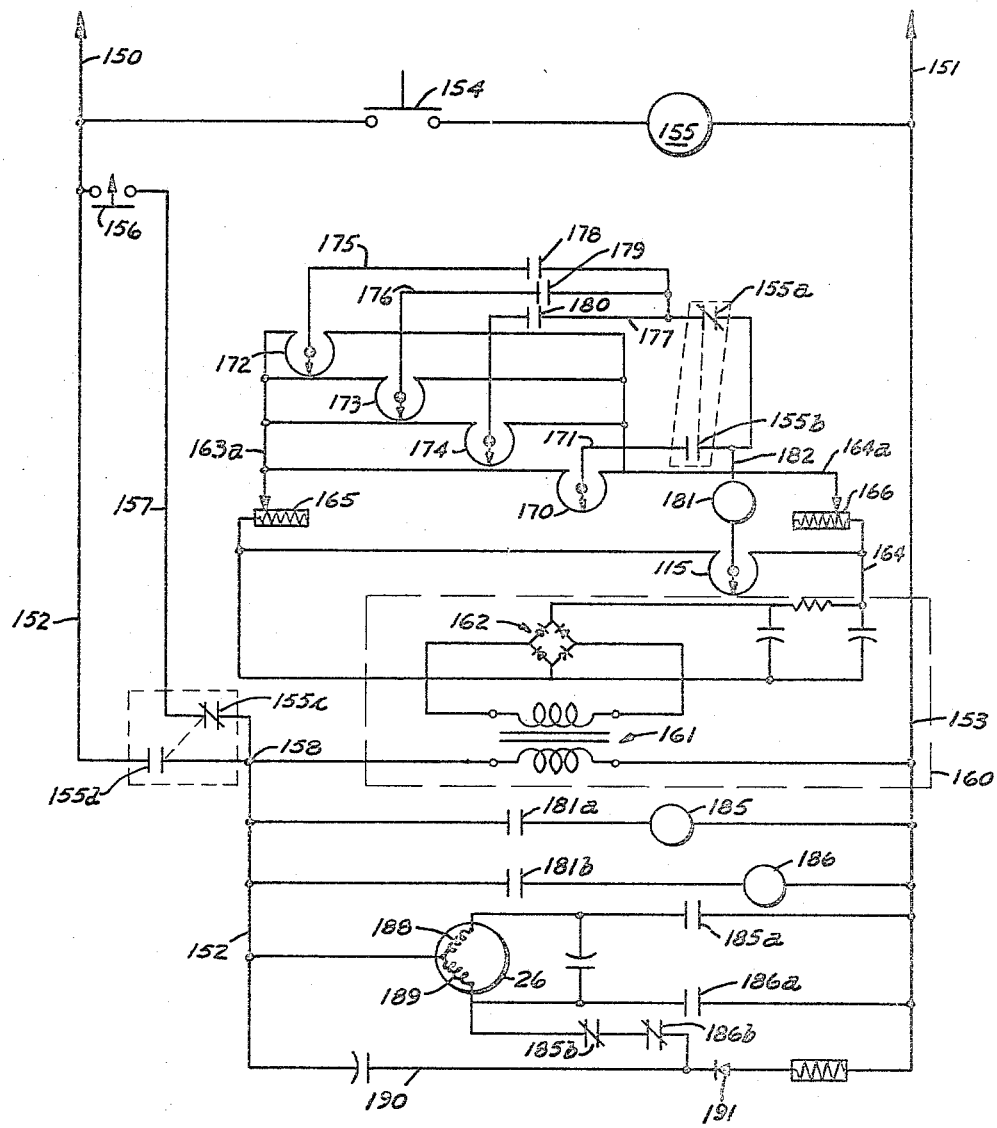

March 21, 1967 — P. J. WEAVER — 3,309,950
TRACER STYLUS ADJUSTMENT
Filed July 6, 1965 — 4 Sheets-Sheet 1
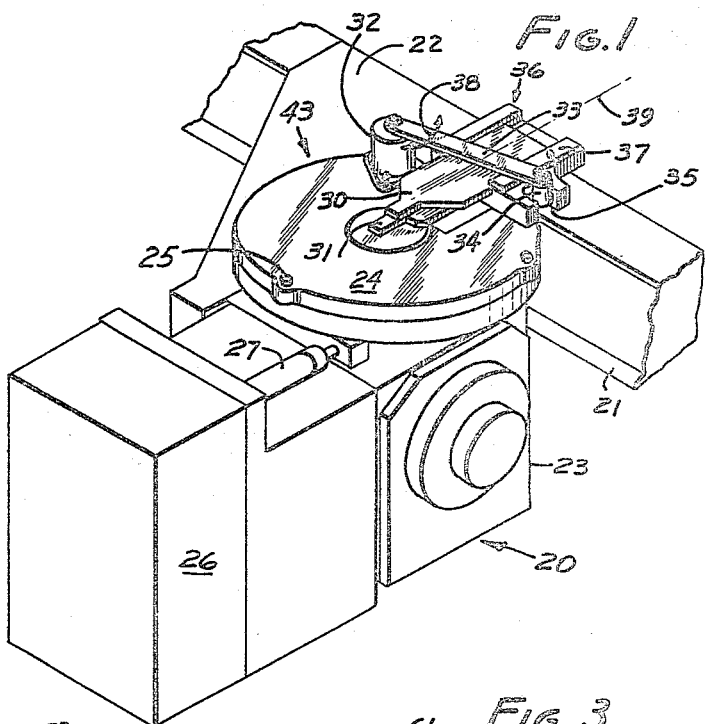
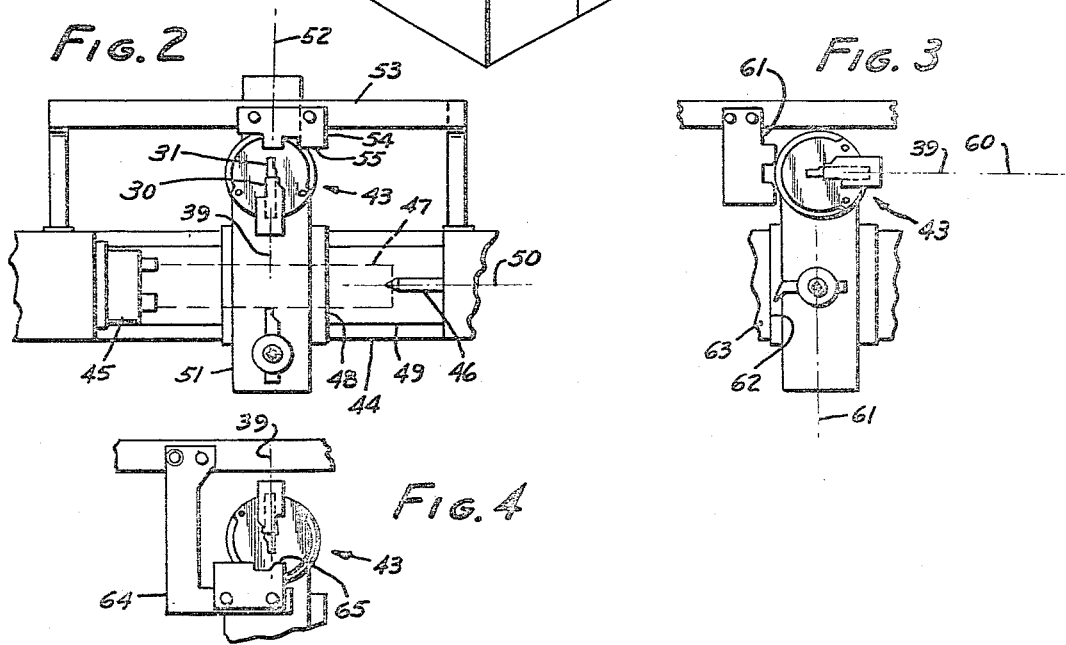
INVENTOR.
PAUL J. WEAVER
BY
ATTORNEYS.

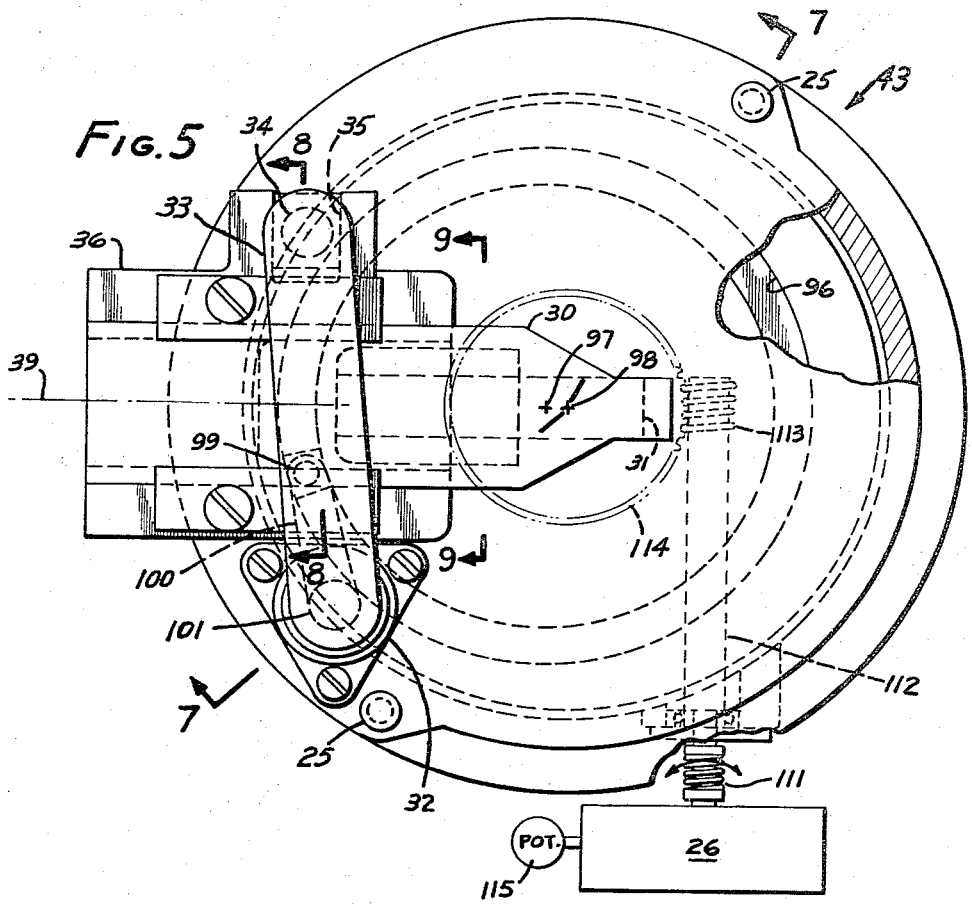
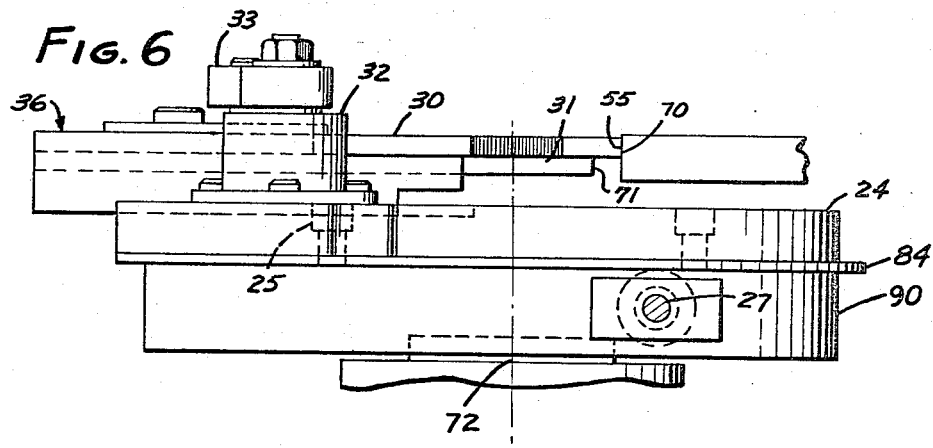

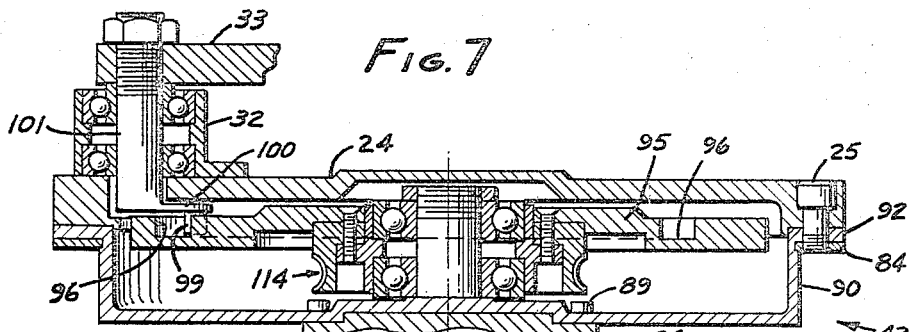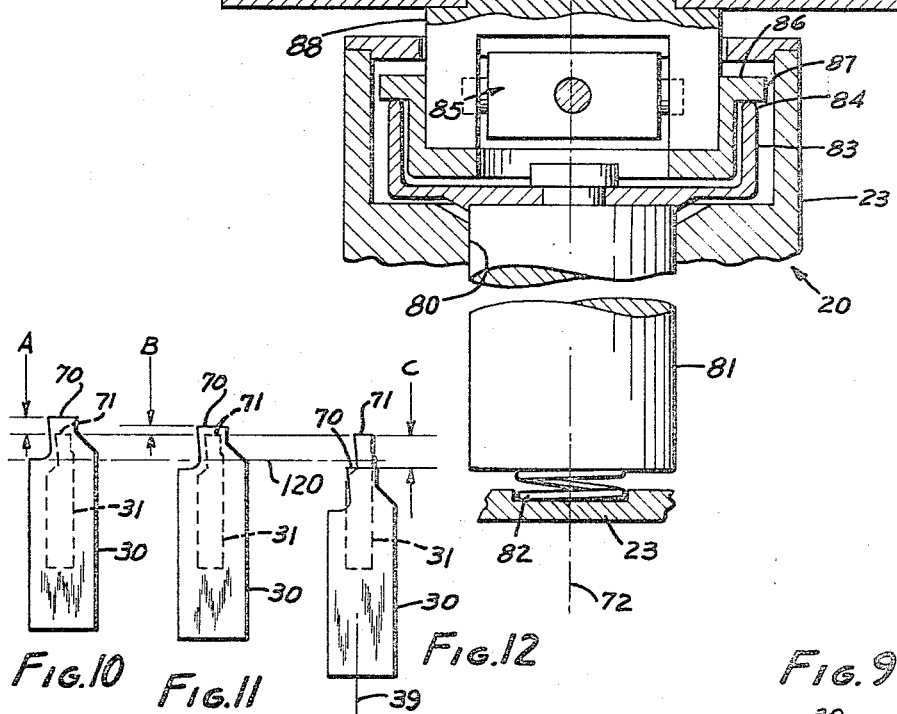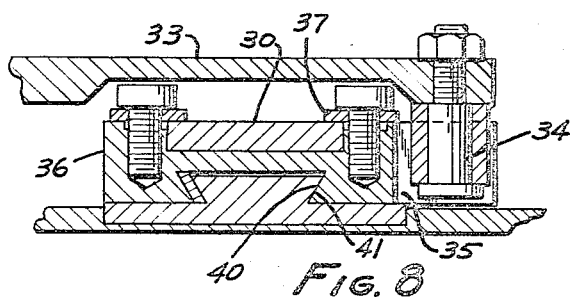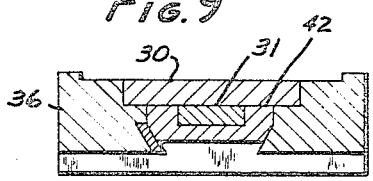

United States Patent Office
3,309,950
Patented Mar. 21, 1967

3,309,950
TRACER STYLUS ADJUSTMENT
Paul J. Weaver, Pasadena, Calif., assignor to True-Trace Corporation, El Monte, Calif., a corporation of Connecticut
Filed July 6, 1965, Ser. No. 469,424
4 Claims. (Cl. 82—14)

This invention relates to tracer-controlled machinery and in particular to a means for enabling multiple passes to be made with the same tracer-template set-up.

In the machining of shapes in processes such as turning, boring and facing, it is conventional practice to provide a template or pattern (these terms being used interchangeably herein) whose profile is that desired on the ultimate workpiece. Then a tracer is caused to follow this profile, and the power it passes as a result of the contact of its stylus with the pattern causes motion within the machine tool which moves the cutting tool and the workpiece relative to each other so as to duplicate in the workpiece the profile of the template. Tracer techniques are well known and are more fully explained in United States patents to Rosebrook Nos. 2,753,145 and 2,835,466, and to Paul J. Weaver No. 3,035,807.

Often the amount of material that is to be removed from the workpiece is so great that multiple passes must be made with the cutting tool. Conventionally, these passes are referred to as rough and finish passes. Often roughing templates are provided for the stylus to follow, and sometimes the roughing passes are made with hand instead of with tracer control. It is an object of this invention to permit the rough and finish passes to be made with the same template and with the same tracer set-up, by providing a plurality of styluses which may readily be adjusted relative to each other and to the tracer reference point, thereby to cause different depths of cut in the various passes.

This invention is carried out in a tracer controlled machine tool of the class wherein the contour of a pattern is duplicated in a workpiece by a cutting tool as a consequence of the following of the pattern by the stylus, the stylus adjusting the tracer to cause it to apply power to the machine tool, thereby to cause the cutting tool and workpiece to move relative to each other in a path similar to the motion of the tracer valve and the pattern. In this invention a first and a second stylus are provided, both styluses being effective to adjust the tracer. The first stylus is movable to a first position where it projects beyond a second stylus so as to contact the pattern instead of the second stylus, and it is movable to a second position where the second stylus contacts the pattern instead of the first stylus, thereby providing a plurality of reference spacings between the pattern and the tracer when the stylus is in contact with the pattern.

According to a preferred but optional feature of the invention, the direction of motion of the styluses relative to the tracer is adjustable.

According to still another preferred but optional feature of the invention, motor means is provided for moving the first stylus from one of the said positions to the other.

The above and other features of this invention will be fully understood from the following detailed description and the accompanying drawings in which:

FIG. 1 is a perspective view showing the presently preferred embodiment of the invention;
FIGS. 2, 3 and 4 are fragmentary plan views, showing various usages of the device of FIG. 1;
FIG. 5 is a top view in cutaway cross-section of the device of FIG. 1;
FIG. 6 is a side view of FIG. 5;
FIGS. 7, 8 and 9 are cross-sections taken at line 7—7, 8—8, and 9—9, respectively, of FIG. 5;
FIGS. 10, 11 and 12 are plan views of a portion of FIG. 1 showing three sequential relative positions of the two styluses; and
FIG. 13 shows a circuit useful to control a portion of the device of FIG. 1.

The presently preferred form of the invention is shown in FIG. 1, where a tracer 20 is mounted to a support rail 21 by clamping means 22. The tracer includes a body 23, a head disk 24, clamp nuts 25, a motor 26, and a stylus drive 27. The object of the invention is to control the relative positions of a first and a second stylus 30, 31, respectively. First stylus 30 is sometimes referred to as the roughing stylus, and the second stylus 31 as the finish stylus.

A bearing 32 supports an arm 33 with a depending pin 34 that projects downwardly into a slot 35 in a stylus holder 36 which supports the first stylus. Overhanging clamp means 37 holds the first stylus in holder 36. Arcuate motion of arm 33 in the direction shown by arrow 38 moves the first stylus back and forth along an axis 39. Bearing 32 is mounted to head disk 24.

As can best be seen in FIGS. 8 and 9, stylus holder 36 includes a dovetail slot 40 which fits on a matching track 41. As can further be seen in FIG. 9, second stylus 31 is held in a stylus holder 42 which is mounted to a head 43 which will be described in greater detail below.

The two styluses both face along axis 39. However, stylus 31 is not adjustably movable after it is clamped in place. Instead, it is properly positioned for the final pass and left in that position. The rough stylus moves along the axis under power derived from arm 33 to vary the reference spacing during rough cuts.

FIGS. 2–4 indicate different positions of head 43. FIG. 2 shows a conventional lathe set-up including a bed 44, head stock 45, tail stock 46, and workpiece 47. A saddle 48 is mounted to move on longitudinal ways 49 along an axis 50. A laterally movable carriage 51 is movable along cross axis 52 on ways located atop saddle 48. Motor means (not shown) are provided for moving the saddle and the carriage along their respective axes, these being conventional and selectively under control of the tracer as discussed in the previously mentioned patents. This is a completely conventional tracer operation and for such details, reference may be had to patents relating to this art. These details are not essential to an understanding of the present invention.

A template rail 53 supports a template or pattern 54 having a profile 55 which is to be duplicated in the workpiece. As the saddle is moved along the longitudinal axis 50, the stylus will contact and follow profile 55 so as to move the tracer and the cutting tool along a path similar to the profile, thereby to reproduce the profile in the workpiece. Conventional means is provided for rotating the workpiece which are of no interest herein.

In FIG. 3, head 43 is shown adjusted so that it is parallel to longitudinal axis 60, and the template is turned so its profile 61 is normal to axis 60. Feed motion is along axis 61, and the cutting tool cuts along a face 62 of workpiece 63, thereby to face the same.

In FIG. 4, the head is shown rotated to perform a boring operation, a boring adapter 64 being provided to hold the profile 65 of the pattern so that it faces in the direction opposite to that of profile 55 in FIG. 2. Then, by using a boring tool, internal boring operations may be performed inside a workpiece (not shown).

From the foregoing, it will be seen that the device of FIG. 1 is adaptable to all conventional types of machining operations as customarily performed on lathes, chuckers and the like. It has the further objective of permitting, with a single basic tracer set-up, the accomplishment of multiple passes simply by adjusting the position of first stylus 30. This can best be seen by reference to FIG. 6, which assumes the general machining set-up of FIG. 2. In this embodiment, tip 70 of first stylus 30 is shown in contact with the upper portion of profile 55. This is because arm 33 has been set to move the rough stylus to a position which projects beyond tip 71 of finish stylus 31. In this way, there is a new basic spacing between the center line 72 of the tracer and the tip of the effective one of the styluses. This will cause the cutting tool to cut a larger diameter than were stylus 31 to be effective. For multiple passes, the rough stylus could be moved back in increments. Finally it will be placed in a second position where it is retracted to the left behind tip 71, so that tip 71 of the finish stylus contacts the template and governs the shape of the finally produced workpiece. It will thereby be seen that by adjusting the position of the rough stylus to overhang the finish stylus in a first position, rough cuts may be taken and by retracting the rough stylus behind the finish stylus, then the final contour may be cut, and this all with one single set-up operation.

FIG. 7 shows more details of the construction of tracer 20. This is the tracer shown in Paul J. Weaver Patent No. 3,035,807, issued May 22, 1962. It includes an internal sleeve 80 with a spool 81 therein, which sleeve and spool are suitably notched or grooved as to act as a four-way valve to direct the flow of fluid to or from a hydraulic motor so that the motor can be operated bi-directionally. The spool is biased upwardly by a spring 82. To the top of the spool, there is fixed a cup 83 with an upper rim 84. Downward pressure on rim 84 at any point thereon causes the spool to move downwardly so as to change the relative position of the spool and sleeve, and thereby adjust the flow conditions through the tracer. This is accomplished by gimbal mounting 85, which gimbal mounting serves to rock a cup 86 when the stylus is pressed laterally in any direction relative to center line 72. The cup has a flange 87 that overhangs rim 84, so that whenever block 88, which forms part of the mounting, is rocked in any direction from the normal central position shown in FIG. 7, then the spool will be lowered in elevation so as to change the flow conditions.

Head 43 is mounted to block 88. This mounting is accomplished by screws 89. The head includes a cup-shaped housing 90 with a flange 92 by means of which fasteners 93 may hold the head disk 84 in a rotationally adjusted position on the housing 90. Within housing 90 there is disposed a cam 95, which cam includes a cam track 96, which is fully peripheral. The center of cam track 96 is shown in FIG. 5 at location 97. The center of the cam plate 95 is shown at location 98. Therefore, rotation of cam plate around center 98 will cause the cam track to shift its radial distance from center 98. A cam follower 99 (FIGS. 5 and 7) on an arm 100 rides in the cam track. Arm 100 is pinned to shaft 101 that is held in bearing 32. Arm 33 is pinned to shaft 101. Therefore, as cam 95 is turned, arm 33 will shift back and forth in the arc indicated by arrow 38. This will cause, by interaction of pin 34 in slot 35, axial motion of the first stylus holder 36 and of the first stylus along axis 39.

When the head disk is turned so as to assume different positions in accordance with FIGS. 2–4, arm 33 will assume different angular positions, and the first stylus will be shifted back and forth. However, as will later be seen, this can be compensated for in a control circuit, so that it is unimportant that there is a degree of freedom between the head disk that carries the arm, and the cam. It will further be noted that when pressure is exerted on either of the styluses, the entire head structure will rock, and this will press down cup 83 so as to adjust the position of the tracer. It will be understood that valve means shown as spool and sleeve 80 and 81 is only one kind of power control means. It is equally possible to operate motors utilizing electrical means such as switches, potentiometers, and the like to control electrical motors, instead of valves which control fluid motors. However, the hydraulic tracer valve art is well-developed, and the structures are simple ones to maintain, and are therefore often preferably to other types.

Rotation of the cam for the purpose of swinging arm 33 to adjust the position of the first stylus is accomplished by operation of a motor 110 which drives a flexible connection 111 and through it a shaft 112. This motor and the shaft do not move with the head assembly. Instead, they are fixed to the body. A spiroid gear 113 is effective on a matching gear 114 on the cam plate 95 for rotating the same. A follow potentiometer 115 is also driven by motor 110 through a gear reduction not shown so as to indicate the position of the cam plate. This potentiometer will be found in circuitry later to be described.

The mechanical operation of this device will best be understood by reference to FIGS. 10, 11 and 12. In FIG. 10, the first stylus overhangs the second stylus by a reference distance A. This is a first position. In FIG. 11, the first stylus has been retracted somewhat and projects beyond the second stylus by a reference distance B. These are both roughing positions in which the tracer operation will be controlled by the first stylus. FIG. 12 indicates the retraction of the first stylus to a position behind the second stylus so that the second stylus controls. There is a spacing C between the two tips, but this has no effect on the part. The second stylus has taken over control. A line 120 is shown between the three figures, which indicate the reference line of the tracer, and it will be seen that in each case, the depth of cut will be different, which is the objective of the invention.

An electrical circuit for controlling the motor 110 will now be discussed.

The circuitry includes a pair of terminals 150, 151, adapted to be connected to a source of electric currents such as 110 volts A.C. These terminals extend to bus lines 152, 153, respectively. A normally open set-up switch 154 is connected to bus 152 and to one terminal of a set-up relay 155. The other terminal of set-up relay 155 is connected to bus 153. Set-up relay 155 operates four contacts, normally closed contact 155a, normally open contact 155b, normally closed contact 155c, and normally open contact 155d. It will be observed that the conditions of contacts 155a and 155b are inverse to each other, as are the conditions of contacts 155c and 155d. A set-up control switch 156 is connected in parallel with a portion of bus 152 through lead 157, lead 157 including contact 155c, and bus 152 including contact 155d, bus 152 and lead 157 rejoining each other at point 158. Switches 154 and 156 are normally open.

A power supply 160 includes a step-down transformer 161 connected between buses 152 and 153. The secondary winding of this transformer is connected to a full wave rectifier 162, which in turn is connected to output leads 163, 164, these leads comprising buses that carry opposite polarities of D.C. current for the control. A pair of trim resistors 165, 166 provide adjusted voltages to buses 163a, 164a.

The winding of a set-up potentiometer 170 is connected between buses 163a and 164a. Its adjustable center tap is connected by lead 171 to contact 155b. The windings of first rough potentiometer 172, second rough potentiometer 173, and finish potentiometer 174 are similarly connected between buses 163a and 164a. Their respective center taps are connected by leads 175, 176, 177 to contact 155a, each of which leads includes a normally open selector switch 178, 179, 180, respectively.

It will now be seen that the condition of contacts 155a and 155b will determine whether the set-up potentiometer 170 will be in circuit with lead 182, or whether a selected one of potentiometers 172–174 will be in connection therewith, assuming of course that one of the selector switches 178–180 is closed.

A sensitive position relay 181 is connected to lead 182 and is energizable by net flow of current therethrough. Position relay 181 is bi-directional and operates a pair of contacts 181a, 181b, which are normally open and are connected to bus 152. They are also in series with respective ones of motor relays 185, 186. Depending on the polarity of current flow through relay 181, either one, but never both, of contacts 181a or 181b will be closed to permit flow of current therethrough. When current flows through one of the respective contacts 181a or 181b, then the respective motor relay 185 or 186 is actuated, and this causes closing of one or the other of contacts 185a or 186a. This will operate motor 26, the direction of operation depending on which of the contacts 185a or 186a is closed, thereby to energize one or the other of windings 188, 189, of motor 26 to cause it to rotate in one direction or the other.

Similarly, relays 185 and 186 control contacts 185b, 186b, which are in series with one winding of motor 26, and connect to a line 190 which includes a rectifier 191. When both of the contacts 185b and 186b are closed, a D.C. voltage is fed into the motor so as to exert a dynamic braking effect on the same in accordance with well-known motor operation when the motor is operating, one or the other of contacts 185b and 186b is open, and there is no braking effect.

Motor 26 turns follow potentiometer 115 to indicate the cam position. Potentiometers 170, 172, 173 and 174 are individually adjustable for purposes yet to be described.

Because of the freedom of plate 84 relative to the cam plate, it is necessary to determine the desired start-up conditions. All of the potentiometers are alike, and it is first necessary to establish the farthest-out desired projection of the first stylus. For this purpose, switch 154 is closed, which actuates relay 155. This closes contact 155a and actuates the power supply, closes contact 155b to connect the tap of set-up potentiometer 170 to lead 182, and disconnects the taps of potentiometers 172–174 at contact 155a. Now the tap of potentiometer 170 is set so that the first stylus moves out to the farthest desired distance, and the setting of potentiometer 170 is read and set into potentiometer 172 which, when later used, will have that same calibrated effect.

The next rough (if there is another) setting is accomplished in the same way as to potentiometer 173, and the final finish adjustment is set into potentiometer 174. The system is then set up, and switch 154 is opened. Now power is supplied through contacts 155c, but only when switch 156 is closed, and taps from potentiometers 172–174 are in circuit through contact 155a and the tap from potentiometer 170 is disconnected from the system by contact 155b. When the device operates, the settings provided by potentiometers 172–174 will be effective only when respective contacts 178–180 are closed, thereby to permit current to flow. These latter contacts may be programmed into programming devices which will actuate them such as by relays.

Position relay 181 is caused to operate contacts 181a and 181b by virtue of its inclusion in a bridge circuit which constitutes follow potentiometer 115 and whichever of potentiometers 172–174 is in circuit at a given time.

Note that all potentiometers are connected across the same reference voltage source, that the tap of the currently effective one of potentiometers 172–174 and the tap of potentiometer 115 are connected to opposite poles of relay 181. This forms a bridge circuit which, unless balanced, causes a net flow of current through relay 181 that causes motor 26 to operate to eliminate the error signal. Thus this device seeks to achieve the cam setting which was adjusted into the respective potentiometers.

This invention thereby provides a multiple stylus system which is readily set up and easily operated.

This invention is not to be limited by the embodiments shown in the drawings and described in the description which are given by way of example and not of limitation, but only in accordance with the scope of the appended claims.

I claim:

1. Apparatus for a tracer-controlled machine tool which duplicates in a workpiece the shape of a pattern, comprising: a tracer having a body, power-control means effective to control power of a machine tool, a first stylus and a second stylus mounted to the body, both styluses being effective to adjust the power-control means, the first stylus being movable to a first position where it projects beyond the second stylus so as to contact the pattern instead of the second stylus, and being movable to a second position where the second stylus contacts the pattern instead of the first stylus, thereby providing two reference spacings between the pattern and the tracer, the power passed by the power-control means being effective to cause the machine tool to undergo motions similar to those of the stylus which contacts the pattern; a universally tiltable head to which both styluses are mounted; a rotatable cam; a track carried by said rotatable cam; a cam follower following said track to move the first stylus; a motor for turning said cam to a predetermined position, a follow potentiometer responsive to the cam position; another potentiometer settable to establish a desired cam position; a bridge network responsive to the conditions of the potentiometers and supplying a signal to cause said motor to turn the cam to the desired position.

2. Apparatus according to claim 1 in which the direction of motion of the styluses is adjustable independently of the cam position.

3. Apparatus according to claim 2 in which a set-up potentiometer is provided initially to calibrate potentiometer levels versus an established level of the follow potentiometer.

4. Apparatus according to claim 1 in which the power control means is a hydraulic valve.

References Cited by the Examiner

UNITED STATES PATENTS

| | | | |
|---|---|---|---|
| 1,562,173 | 11/1925 | Huguet | 82—14 |
| 2,913,945 | 11/1959 | Granberg et al. | 82—14 |
| 3,146,647 | 9/1964 | Bollman | 82—14 |

OTHER REFERENCES

German printed application, Erdman, L 21,248. Ib/49a.

WILLIAM W. DYER, JR., *Primary Examiner.*

G. A. DOST, *Examiner.*